Feb. 19, 1952   P. B. KELLER   2,586,430
CHART-READING DEVICE
Filed April 14, 1947   2 SHEETS—SHEET 1
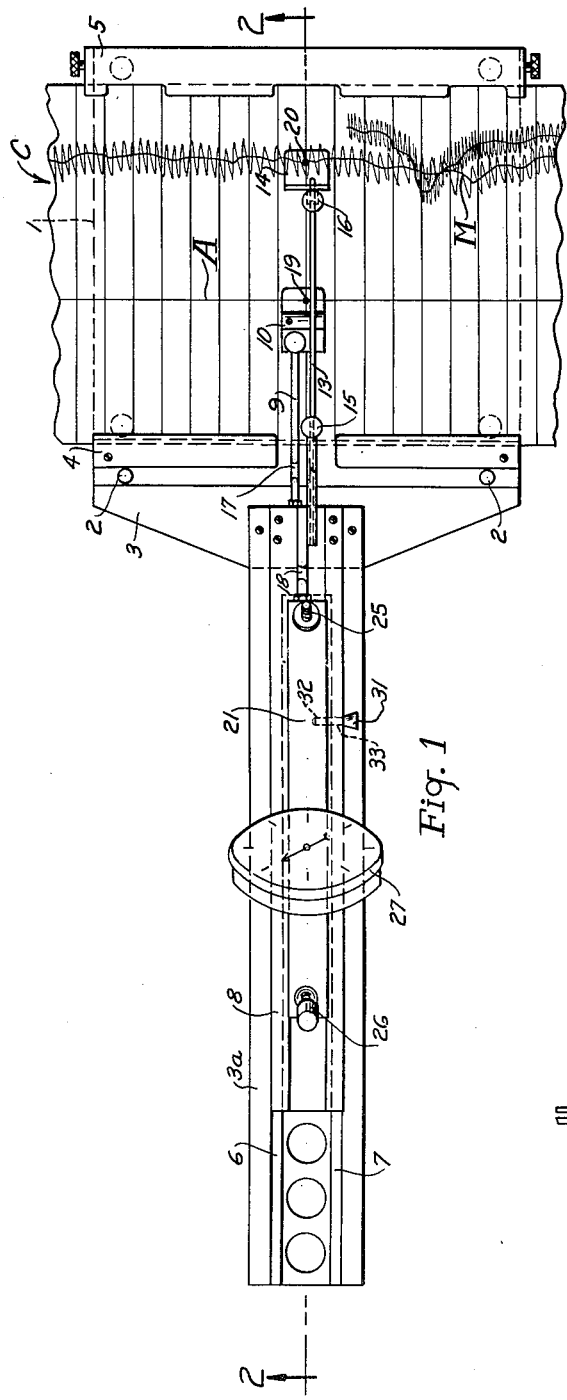
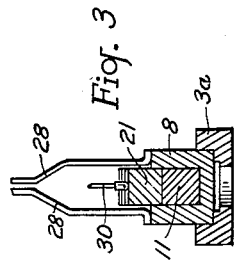
INVENTOR.
PHILIP B. KELLER
BY William P. Lane
ATTORNEY Feb. 19, 1952
P. B. KELLER
2,586,430
CHART-READING DEVICE
Filed April 14, 1947
2 SHEETS—SHEET 2
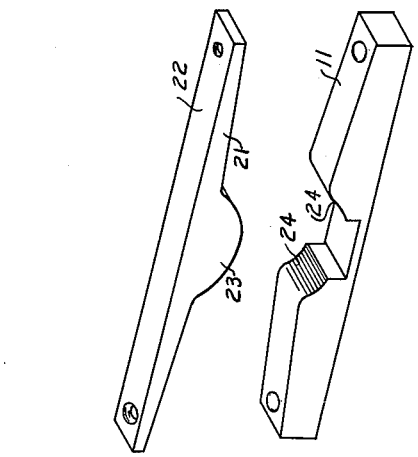
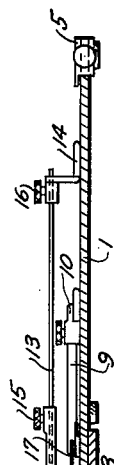
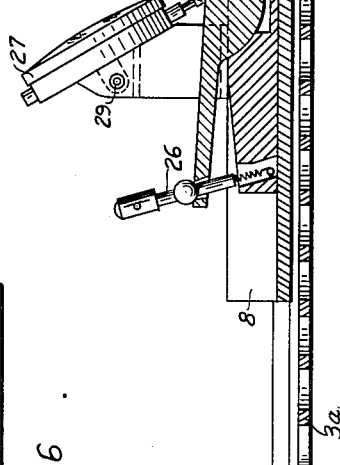
*INVENTOR.*
PHILIP B. KELLER
BY
*William R. Lane*
ATTORNEY Patented Feb. 19, 1952

2,586,430

UNITED STATES PATENT OFFICE 2,586,430

CHART READING DEVICE

Philip B. Keller, Santa Monica, Calif., assignor to North American Aviation, Inc.

Application April 14, 1947, Serial No. 741,398

1 Claim. (Cl. 33—125)

This invention relates to an apparatus for obtaining data from oscillograph record strips. Such strips comprise a photographic or other recording of an oscillograph or other instrument which is responsive to oscillations or other variations from a normal condition.

The record strips so made may contain one or several traces, each recorded by an individual unit and each representing a measure of variations in a condition. The record strips are made by a recording mechanism which is driven in a manner well known in the art at a preselected speed to correlate the time intervals on the strip with the time of the test.

It may be desired to measure the variations in any curve on the strip at the measured time intervals, or only at high and low points thereof. For this purpose a base line is usually provided on the strip from which such measurements can be taken. This base line may be referred to as an abscissa line for purposes of the present consideration, distances from such base line being referred to as ordinates or ordinate distances. In certain instances it is desirable to obtain variations in mean ordinate distances such as may be occasioned when the oscillations are regular but the condition is such that the mean ordinate distances vary between selected abscissae.

Reference is made to application Serial Number 711,905, filed November 23, 1946, issued as Patent No. 2,533,649 on December 12, 1950, in the name of D. K. Warner, with respect to which this is a modified form of invention.

As in the case of mentioned application, the invention herein described enables the reading of distances on a strip chart with facility.

It is therefore an object of this invention to provide an apparatus for directly obtaining details from a strip chart.

It is a further object of this invention to provide a relatively simple apparatus having but a few parts which need to be accurately made, but which obtains quite accurate results.

It is still a further object of this invention to provide in a chart reading device an arrangement whereby data obtained from a chart may be visually indicated by an arrangement which may be readily varied to accommodate different chart scales.

Further objects of invention will become apparent from the following description taken in connection with the attached drawings, of which Fig. 1 is a top plan view of the invention;

Fig. 2 is a sectional view taken generally along the line 2—2 of Fig. 1, but with certain parts shown in elevation;

Fig. 3 is a sectional view taken generally along the line 3—3 of Fig. 2;

Figs. 4 and 5 are isometric views of details of the invention.

Fig. 6 is a plan view of a modified form of the invention.

Referring to the drawings, a chart supporting table member or base 1 is adapted to be detachably connected by screws 2 to a base member 3. The table member is provided with guide portions 4 and 5 to facilitate handling of the record strip. Different size table portions may be provided for different record strips if so desired, or the table may be made adjustable to enable handling of strips of different widths. The base member is provided with an elongated portion 3a having guideways at 6 and 7 for slidably supporting a channel member 8 to which is attached by arm 9 an indexing member 10. Slidably positioned in channel member 8 is a support block 11 to which is attached by relatively adjustable arms 12 and 13 a second indexing member 14. Set-screw 15 holds the arms in adjusted position while any additional adjustment may be obtained by set-screw 16 for holding member 14 on arm 13. Arms 9 and 12 may be connected to members 8 and 11 respectively, by flexible joints 17 and 18 respectively, which may be made of spring steel or other suitable material to hold the arms in proper position but permit lifting of the same to facilitate placing of the charts on the table. Indexing members 10 and 14 comprise transparent material of plastic, or the like, and preferably include a dot or crosslines, as at 19 and 20, adapted to be positioned with respect to preselected points on the chart. Obviously, pointers or other equivalent means may be used in lieu of members 10 and 14. Tiltably supported upon block 11 is a proportionator element 21 having an upper surface 22 adapted to be engaged by stem 30 of an indicator element, for a purpose to be hereinafter more fully described, and a bearing portion at 23 adapted to engage corresponding bearing surface 24 on block 11. The proportionator element is held in adjusted position on the block by means of a screw arrangement at 25 and a tension arrangement at 26 adapted to urge the proportionator element in a counter-clockwise direction as shown in Fig. 2. A visual dial indicator 27 is supported on member 8 by bracket members 28 and pin 29. The visual dial indicator may be of a well known type having a slidable stem 30 adapted to operate an indicating pointer. As may be noted in Fig. 2, stem 30 is arranged to be held in position to engage and be responsive to surface 22 of proportionator element 21. It may be desired to provide stem 30 with a ball point for the purpose of reducing friction as a result of engagement with surface 22. Further, a rack and pinion may be provided between channel member 8 and base 3a for positively moving and positioning the same.

In the operation of the device a chart C is placed on table 1, and member 8 shifted in its guideway until indexing member 10 is positioned with the reading dot or cross-lines 19 thereof in alignment with a preselected point which may be on abscissa line A or any other point selected as a base from which measurements are to be taken. Thereupon, proportionator element 21 is tilted by adjustment of screw 25 to coordinate the indices or scales of the indicator 27 and the chart to enable direct reading on the dial of distances measured on the chart. The relative positions of arm members 12 and 13 and indexing member 14 thereon are usually left unchanged if within operative range in respect of the curves on the chart and therefore need not be further coordinated other than through member 21. Block member 11 is then moved until the dot or cross-lines at 20 is in alignment with the point to be read on the chart. The distance between points 19 and 20 is thereupon directly indicated on dial 27 in the units of the chart.

The device is especially adapted for use in reading variations in the general trend of a curve. For instance, a curve having substantially constant oscillations will move generally back and forth on the oscillograph chart. To measure such movement, the indexing member 10 is placed on the base or abscissa line, the member 14 is aligned with a selected point on the center line drawn generally at the mean points of successive oscillations. Such a line is illustrated at M in Fig. 1. The dial indicator is then set at zero and the proportionator element 21 adjusted by screw 25 until movement of member 14 is measured and indicated directly on indicator gauge 27 in the units of the chart.

To enable ready adjustment of the angle of the element 21 with respect to the scale of the chart there may be provided in block 11 an opening 32 adapted to receive a pin 31 which is also receivable in a corresponding opening 33 in channel member 8. When the pin 31 is received in openings 32 and 33 the parts are in such a relationship that the point of the stem 30 engaging the surface 22 of member 21 is at the center of rotation of the member 21 upon its bearings 24. This may be referred to as a zero position. If the end of the stem 30 has any substantial radius, the center of rotation or pivotation of member 21 must necessarily coincide with the center of the rounded end of the stem 30. In the event a ball point is used, the center of pivotation will of course be at the center of the ball.

By means of this pin arrangement, block 11 and channel member 8 may be fastened together with the stem 30 at the zero position as hereinbefore described, thereby permitting movement of the two indexing members in unison so that indexing member 10 may be brought into coincidence with a mark of known value predeterminately positioned on the chart or the particular curve in a manner well known in the art. Thereupon, index member 14 may be adjusted by loosening either or both set-screws 15 and 16 and moving member 14 until it is brought into coincidence with a previously indicated mark of known or determined value on the curve or the chart. The dial indicator is then adjusted to bring its reading into coincidence with the known distance between indexing means 10 and 14. Pin 31 is then removed, adapting the member 14 to be moved to any selected point on the curve, the characteristics of which are to be measured from the initial abscissa position or line thus established, whereby any difference between indexing members 10 and 14 will be indicated on dial 27 in the units of the chart.

In a somewhat modified form, this device may be used for obtaining the first derivative of a curve by means of a bar 34, which may be referred to as a tangent bar, pivotally attached at 35 to one indexing means and slidable and pivotal by pin 36 and slot 37 with respect to the other indexing means. Slot 37 in this arrangement is parallel to the edge of the tangent bar containing reference mark 38. Guide means 39 holds the arms in parallel position while permitting relative sliding movement therebetween. By means of this arrangement, the indexing means may be initially positioned at zero by pin 31 engaging openings 32 and 33 in channel member 8 and block 11. The channel member and block are then moved in unison to position reference point 38 at a selected point on a curve, the first derivative of which is to be obtained. Thereupon the pin 31 is removed and the tangent bar pivoted until the reference point 38 is tangent to the curve at the selected point. The dial indicator is then read, giving a value which amounts to the tangent of the angle times a value imposed by the setting on the proportionator element 21. Obviously, this arrangement may be used in connection with different units, the principle of operation remaining the same in all instances.

Although the invention has been described and illustrated in detail, it is to be clearly understood that the same is by way of illustration and example only and is not to be taken by way of limitation, the spirit and scope of this invention being limited only by the terms of the appended claim.

I claim:

A measuring device for a record strip having one or more curves transcribed thereon comprising indexing means to be positioned at a selected point on said strip, a second indexing means including a pivotally adjustable inclined surface operatively associated with said first indexing means and movable in an ordinate direction with respect thereto; a dial indicator carried by said first indexing means and having a stem engaging said inclined surface, the axis of said stem intersecting the center of pivotation of said inclined surface, whereby the relative positions of said indexing means are read on said dial indicator.

PHILIP B. KELLER.

REFERENCES CITED

The following references are of record in the file of this patent:

UNITED STATES PATENTS

| Number | Name | Date |
|---|---|---|
| 990,385 | Pierce | 1911 |
| 1,059,757 | Pivoda | Apr. 22, 1913 |
| 1,312,546 | Karasick | Aug. 12, 1919 |
| 1,506,704 | Williamson | Aug. 26, 1924 |
| 1,725,898 | Chaperlo | Aug. 27, 1929 |
| 2,296,104 | Handley | Sept. 15, 1942 |
| 2,328,762 | Webster | Sept. 7, 1943 |
| 2,359,018 | Balk | Sept. 26, 1944 |
| 2,413,841 | Minuto | Jan. 7, 1947 |
| 2,424,619 | Keepers | July 29, 1947 |
| 2,442,098 | Shewell | May 25, 1948 |

FOREIGN PATENTS

| Number | Country | Date |
|---|---|---|
| 272,146 | Great Britain | 1927 |
| 291,023 | Great Britain | 1928 |
| 338,186 | Great Britain | 1930 |